(12) United States Patent
Hua et al.

(10) Patent No.: US 12,402,185 B2
(45) Date of Patent: Aug. 26, 2025

(54) WIRELESS CONNECTION METHOD AND APPARATUS, AND TERMINAL DEVICE

(71) Applicant: Huawei Technologies Co., Ltd., Shenzhen (CN)

(72) Inventors: Wen Hua, Shenzhen (CN); Haowei Liang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 495 days.

(21) Appl. No.: 17/913,309

(22) PCT Filed: Mar. 19, 2021

(86) PCT No.: PCT/CN2021/081803
§ 371 (c)(1),
(2) Date: Sep. 21, 2022

(87) PCT Pub. No.: WO2021/197098
PCT Pub. Date: Oct. 7, 2021

(65) Prior Publication Data
US 2023/0143640 A1    May 11, 2023

(30) Foreign Application Priority Data
Mar. 30, 2020    (CN) .......................... 202010239665.3

(51) Int. Cl.
H04W 76/10    (2018.01)
H04W 4/02    (2018.01)
H04W 76/14    (2018.01)

(52) U.S. Cl.
CPC ........... *H04W 76/14* (2018.02); *H04W 4/023* (2013.01)

(58) Field of Classification Search
CPC ....... H04W 76/14; H04W 4/023; H04W 4/80; H04W 8/005; H04W 84/18; H04W 4/025;
(Continued)

(56) References Cited

U.S. PATENT DOCUMENTS 11,159,932 B1 * 10/2021 Meyer ................... G06F 3/0488
11,467,277 B2 * 10/2022 Masui ..................... B60R 21/00
(Continued)

FOREIGN PATENT DOCUMENTS

CN    103874228 A    6/2014
CN    103916978 A    7/2014
(Continued)

*Primary Examiner* — Cindy Trandai
(74) *Attorney, Agent, or Firm* — Slater Matsil, LLP

(57) ABSTRACT

A method includes: A terminal device determines a first device in an image displayed on a capture screen, and obtains a first distance and a first azimuth; and searches a Bluetooth device list for a Bluetooth device matching the first distance and the first azimuth, and establishes a wireless connection to the matched Bluetooth device, where the first distance is a distance between the terminal device and the first device, and the first azimuth is an azimuth of the first device relative to the terminal device. According to this method, the Bluetooth device list is searched for the matched Bluetooth device only by using the first distance and the first azimuth. This prevents a user from searching, by using a device name, the Bluetooth device list for a device that needs to be connected.

20 Claims, 13 Drawing Sheets

(58) Field of Classification Search
CPC ....... H04W 4/08; H04W 76/10; H04W 48/08; H04W 48/16; G06N 20/00; G06N 3/08; H04M 2201/34; H04M 2250/02; H04M 1/72415
See application file for complete search history.

(56) References Cited

U.S. PATENT DOCUMENTS

| | | | |
|---|---|---|---|
| 2012/0172060 A1 | 7/2012 | Qing et al. | |
| 2014/0187164 A1 | 7/2014 | Yang et al. | |
| 2016/0286350 A1* | 9/2016 | Lin | H04B 1/385 |
| 2016/0358019 A1* | 12/2016 | Kato | H04W 4/02 |
| 2018/0124552 A1* | 5/2018 | Cho | H04W 4/80 |
| 2018/0178811 A1* | 6/2018 | Ohta | G08G 1/167 |
| 2019/0001978 A1* | 1/2019 | Takaki | G01S 13/867 |
| 2019/0208392 A1* | 7/2019 | Merjanian | G06T 11/60 |
| 2019/0306902 A1 | 10/2019 | Debates et al. | |
| 2019/0380161 A1* | 12/2019 | Song | H04W 84/18 |
| 2020/0296284 A1* | 9/2020 | Aikawa | H04N 23/661 |
| 2021/0232858 A1* | 7/2021 | Mukherjee | G06T 7/70 |
| 2021/0410201 A1* | 12/2021 | Kim | H04N 23/61 |
| 2022/0012910 A1* | 1/2022 | Forsberg | G01S 5/163 |

FOREIGN PATENT DOCUMENTS

| | | |
|---|---|---|
| CN | 104111059 A | 10/2014 |
| CN | 105828274 A | 8/2016 |
| CN | 106125918 A | 11/2016 |
| CN | 107305133 A | 10/2017 |
| CN | 107533230 A | 1/2018 |
| CN | 108646997 A | 10/2018 |
| CN | 108919942 A | 11/2018 |
| CN | 109471605 A | 3/2019 |
| CN | 110545520 A | 12/2019 |
| CN | 110582078 A | 12/2019 |
| CN | 111432331 A | 7/2020 |

* cited by examiner

WIRELESS CONNECTION METHOD AND APPARATUS, AND TERMINAL DEVICE

CROSS-REFERENCE TO RELATED APPLICATIONS

This application is a national stage of International Application No. PCT/CN2021/081803, filed on Mar. 19, 2021, which claims priority to Chinese Patent Application No. 202010239665.3, filed on Mar. 30, 2020. Both of the aforementioned applications are hereby incorporated by reference in their entireties.

TECHNICAL FIELD

This application relates to the field of terminal technologies, and in particular, to a wireless connection method and apparatus, and a terminal device.

BACKGROUND

Currently, cross-device interaction, for example, file transmission or image screen projection, may be implemented by using a Bluetooth technology. For example, file transmission usually includes two processes: device connection and file transmission. Specifically, in the first process, Bluetooth of a terminal device is first enabled to open a Bluetooth device list, the Bluetooth device list is searched for a name of a to-be-paired target device, and the name of the target device is clicked to complete pairing. In the second process, the terminal device transmits data or a file to the target device, to implement resource sharing.

When the target device is searched for in the Bluetooth device list, the name of the device is default or is set by a user. It is difficult for the user to identify, based on a device name, a Bluetooth device corresponding to the device name. For example, as shown in FIG. 1, an original name of a device is Huawei Mate 20. However, a holder modifies the name of the device to "Computer", so that the name of the device that is displayed in a Bluetooth device list is "Computer". Consequently, difficulty that a user recognizes a target device in the Bluetooth device list is increased.

In addition, with popularity of an Internet of Things (Internet of things, IOT) technology, various IOT devices, such as a headset, a sound box, a notebook computer, and AR glasses, are searched for and displayed in a Bluetooth device list. Consequently, the Bluetooth device list becomes lengthy and complex, and it is more difficult to perform searching.

SUMMARY

Embodiments of this application disclose a wireless connection method and apparatus, to search a Bluetooth device list for a corresponding Bluetooth device, establish a wireless connection to the Bluetooth device, and improve connection efficiency. To resolve the technical problem, the following technical solutions are disclosed in this application:

According to a first aspect, an embodiment of this application provides a wireless connection method. The method may be applied to a terminal device. Specifically, the method includes: A terminal device determines a first device in an image displayed on a capture screen, and obtains a first distance and a first azimuth, where the first distance is a distance between the terminal device and the first device, and the first azimuth is an azimuth of the first device relative to the terminal device. In addition, the method further includes: The terminal device searches a Bluetooth device list for a Bluetooth device matching the first distance and the first azimuth, and establishes a wireless connection between the terminal device and the matched Bluetooth device.

Optionally, the terminal device may obtain the first distance by using a binocular vision-based ranging method or through measurement by using a time of flight TOF camera. In addition, the terminal device may alternatively obtain the first distance by using another method. This is not limited in this application.

According to the method provided in this aspect, the terminal device obtains the first distance and the first azimuth that are related to the first device in the capture screen, searches the Bluetooth device list for the Bluetooth device matching the first distance and the first azimuth, and establishes the wireless connection to the Bluetooth device. This prevents a user from searching, by using a device name, the Bluetooth device list for a device that needs to be connected, thereby improving wireless connection efficiency and simplifying an operation of the user.

It should be understood that the first device in this embodiment is any device in the image displayed on the capture screen.

With reference to the first aspect, in a possible implementation of the first aspect, that the terminal device searches a Bluetooth device list for a Bluetooth device matching the first distance and the first azimuth includes: The terminal device searches the Bluetooth device list for the Bluetooth device whose distance difference is not greater than a first preset value and whose azimuth difference is not greater than a second preset value.

The distance difference is a difference between the first distance and a second distance, and the second distance is a distance that is between the terminal device and the matched Bluetooth device and that is measured by using a Bluetooth positioning function. More specifically, the second distance may be understood as a distance between an antenna array of the terminal device and an antenna array of the Bluetooth device. The azimuth difference is a difference between the first azimuth and a second azimuth, and the second azimuth is an azimuth that is of the matched Bluetooth device relative to the terminal device and that is measured by using a Bluetooth direction-finding function.

In this implementation, the terminal device compares the first distance and the first azimuth with the second distance and the second azimuth that are of the Bluetooth device in the Bluetooth device list and that are obtained by using the Bluetooth positioning function, to search the Bluetooth device list for the Bluetooth device that matches the first device. In this way, a wireless connection is established between a target device in the capture screen and a matched Bluetooth device in the Bluetooth device list. This prevents the user from searching, by using a device name, the Bluetooth device list for a device that needs to be connected, simplifies an operation of the user, and improves connection efficiency.

It should be noted that, in the foregoing process of comparing parameters related to the first device with parameters related to the Bluetooth device, when the distance difference does not exceed the first preset value and the azimuth difference does not exceed the second preset value, it is determined that the matched Bluetooth device in the Bluetooth device list is the first device in the capture screen, and the wireless connection is further established between the terminal device and the Bluetooth device, that is, a wireless connection is established between the terminal device and the first device in the capture screen.

With reference to the first aspect, in another possible implementation of the first aspect, that the terminal device searches a Bluetooth device list for a Bluetooth device matching the first distance and the first azimuth includes: The terminal device obtains an angle of view of the capture screen and an attitude angle of the terminal device, determines a first device set based on the angle of view and the attitude angle, and searches the first device set for the matched Bluetooth device. The first device set is a subset of the Bluetooth device list. The angle of view of the capture screen is determined based on a focal length of a camera or a camera of the terminal device, and the attitude angle of the terminal device may be obtained through measurement and reporting by using a sensor on the terminal device.

The determining a first device set based on the angle of view and the attitude angle specifically includes:
- determining a preset angle range based on the angle of view α of the capture screen and the attitude angle β of the terminal device first, where
- when β+α/2≤360°, the preset angle range is [=−α/2, β+α/2], and
- when β+α/2>360°, the preset angle range is a union set of [0, β+α/2−360° ] and [β−α/2, 360° ]; and
- determining that the first device set includes the Bluetooth device within the preset angle range.

In this implementation, a search range is narrowed from all devices in the Bluetooth device list to the first device set related to the angle of view of the capture screen, and a device outside the angle of view is filtered. Therefore, a quantity of to-be-recognized devices in the Bluetooth device list is reduced, and search efficiency is improved.

With reference to the first aspect, in still another possible implementation of the first aspect, the first azimuth is θ1=β, and β is the attitude angle of the terminal device. In this implementation, the azimuth of the first device can be quickly determined by using the attitude angle of the terminal device, thereby improving efficiency of connecting the terminal device to the Bluetooth device.

Alternatively, the first azimuth is:

$$\theta 1 = \beta + \left(\frac{P1}{P} - \frac{1}{2}\right) \times \alpha \text{ or } \theta 1 = \beta + \left(\frac{1}{2} - \frac{P2}{P}\right) \times \alpha.$$

θ1 is the first azimuth, α is the angle of view of the capture screen, and β is the attitude angle of the terminal device. P1 is a quantity of pixels from a center of the first device in the capture screen to a left edge of the capture screen, P2 is a quantity of pixels from the center of the first device in the capture screen to a right edge of the capture screen, P is a quantity of pixels corresponding to a width of the capture screen, and P1/P or P2/P is a relative position of the first device in the capture screen.

In this implementation, the first azimuth can be accurately determined based on the attitude angle of the terminal device, the angle of view of the capture screen, and the relative position of the first device in the capture screen, thereby improving accuracy of searching for the Bluetooth device.

With reference to the first aspect, in various possible implementations of the first aspect, the method further includes: The terminal device obtains feature information of a first user in the capture screen, establishes a correspondence between the first device and the feature information of the first user, and finally stores the correspondence in a storage medium of the terminal device.

In addition, the method further includes: The terminal device establishes a wireless connection to the first device based on the feature information of the first user and the stored correspondence. In this way, the matched Bluetooth device can be further prevented from being searched for through parameter comparison of the first distance and the first azimuth again. According to this method, the first device can be quickly searched for based on the feature information of the first user and the correspondence, and can be connected, thereby improving connection efficiency.

The feature information of the first user includes but is not limited to information such as facial features of the first user, and a name, a phone number, and an E-mail of the first user. The facial features of the first user include an eye feature, an eyebrow feature, an ear feature, a nose feature, a mouth feature, and the like of the first user, and these facial features can be obtained by using a facial recognition technology.

According to a second aspect, an embodiment of this application further provides a wireless connection apparatus, where the apparatus may be a terminal device or may be configured in a terminal device. The wireless connection apparatus includes an obtaining unit and a processing unit, where the processing unit is configured to determine a first device in an image displayed on a capture screen; the obtaining unit is configured to obtain a first distance and a first azimuth; and the processing unit is further configured to search a Bluetooth device list for a Bluetooth device that matches the first distance and the first azimuth, and establish a wireless connection to the matched Bluetooth device.

The first distance is a distance between the terminal device and the first device, and the first azimuth is an azimuth of the first device relative to the terminal device. In addition, the first distance may be obtained in a manner, for example, by using a binocular vision-based ranging method or through measurement by using a time of flight TOF camera. The first azimuth may be obtained based on an attitude angle of the terminal device. For example, the first azimuth is θ1=β, and β is the attitude angle of the terminal device.

Optionally, the first azimuth may be alternatively determined based on an angle of view of the capture screen, an attitude angle of the terminal device, and a relative position of a center of the first device in the capture screen.

For example, the first azimuth is:

$$\theta 1 = \beta + \left(\frac{P1}{P} - \frac{1}{2}\right) \times \alpha \text{ or } \theta 1 = \beta + \left(\frac{1}{2} - \frac{P2}{P}\right) \times \alpha.$$

θ1 is the first azimuth, α is the angle of view of the capture screen, and β is the attitude angle of the terminal device. P1/P or P2/P is the relative position of the center of the first device in the capture screen, P1 is a quantity of pixels from the center of the first device in the capture screen to a left edge of the capture screen, P2 is a quantity of pixels from the center of the first device in the capture screen to a right edge of the capture screen, and P is a quantity of pixels corresponding to a width of the capture screen.

With reference to the second aspect, in a possible implementation of the second aspect, the processing unit is specifically configured to search the Bluetooth device list for the Bluetooth device whose distance difference is not greater than a first preset value and whose azimuth difference is not greater than a second preset value.

The distance difference is a difference between the first distance and a second distance, and the second distance is a distance that is between the terminal device and the matched Bluetooth device and that is measured by using a Bluetooth positioning function. The azimuth difference is a difference between the first azimuth and a second azimuth, and the second azimuth is an azimuth that is of the matched Bluetooth device relative to the terminal device and that is measured by using a Bluetooth direction-finding function.

With reference to the second aspect, in another possible implementation of the second aspect, the obtaining unit is further configured to obtain the angle of view of the capture screen and the attitude angle of the terminal device; and the processing unit is specifically configured to determine a first device set based on the angle of view and the attitude angle, and search the first device set for the matched Bluetooth device, where the first device set is a subset of the Bluetooth device list.

When $\beta+\alpha/2 \leq 360°$, a preset angle range is $[\beta-\alpha/2, \beta+\alpha/2]$; and when $\beta+\alpha/2 > 360°$, the preset angle range is a union set of $[0, \beta+\alpha/2-360°]$ and $[\beta-\alpha/2, 360°]$, where $\alpha$ is the angle of view of the capture screen, and $\beta$ is the attitude angle of the terminal device.

With reference to the second aspect, in various possible implementations of the second aspect, the wireless connection apparatus further includes a storage unit. In addition, the obtaining unit is further configured to obtain feature information of a first user in the capture screen; and the processing unit is further configured to establish a correspondence between the first device and the feature information of the first user, and store the correspondence in the storage unit.

In addition, the processing unit is further configured to establish a wireless connection to the first device or transmit data to the first device based on the feature information of the first user and the stored correspondence.

According to a third aspect, an embodiment of this application further provides a terminal device, including a processor and a memory, where the processor is coupled to the memory. Specifically, the memory may be configured to store computer program instructions. The processor may be configured to execute the instructions stored in the memory, to enable the terminal device to perform the method in the first aspect and the various implementations of the first aspect.

According to a fourth aspect, an embodiment of this application further provides a computer-readable storage medium, where the storage medium stores instructions, so that when the instructions are run on a computer or a processor, the method in the first aspect and the various implementations of the first aspect can be performed.

In addition, an embodiment of this application further provides a computer program product. The computer program product includes computer instructions. When the instructions are executed by a computer or a processor, the method in the first aspect and the various implementations of the first aspect can be implemented.

According to a fifth aspect, an embodiment of this application further provides a chip, including a processor and an interface circuit, where the interface circuit is coupled to the processor. Specifically, the processor may be configured to execute a computer program or instructions, to implement the method in the first aspect and the various implementations of the first aspect. The interface circuit is configured to communicate with another module other than the chip.

It should be noted that beneficial effects corresponding to the technical solutions of the various implementations of the second aspect to the fifth aspect are the same as beneficial effects of the first aspect and the various implementations of the first aspect. For details, refer to the descriptions of the beneficial effects of the first aspect and the various implementations of the first aspect. Details are not described herein again.

DETAILED DESCRIPTION OF ILLUSTRATIVE EMBODIMENTS

To make a person skilled in the art understand the technical solutions in embodiments of this application better, and make the objectives, features, and advantages of embodiments of this application clearer, the following further describes the technical solutions in embodiments of this application in detail with reference to the accompanying drawings.

Figure 1:
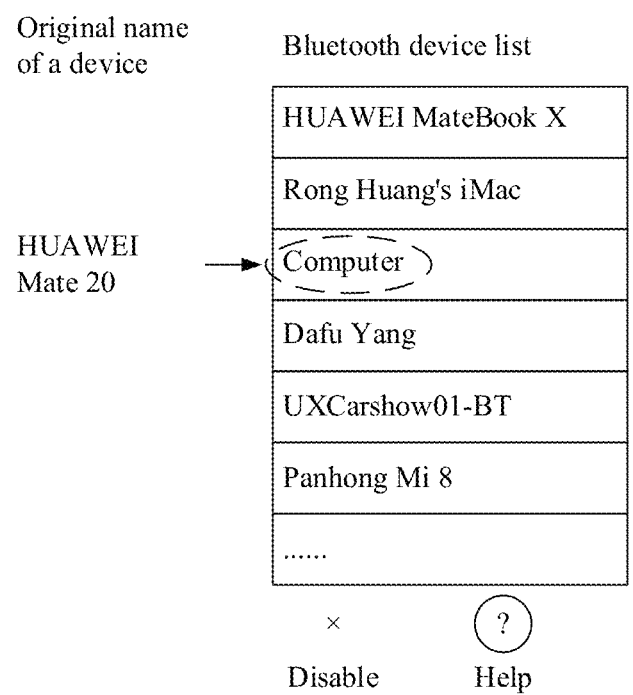
FIG. 1 is a schematic diagram of a Bluetooth device list according to this application.
Figure 2:
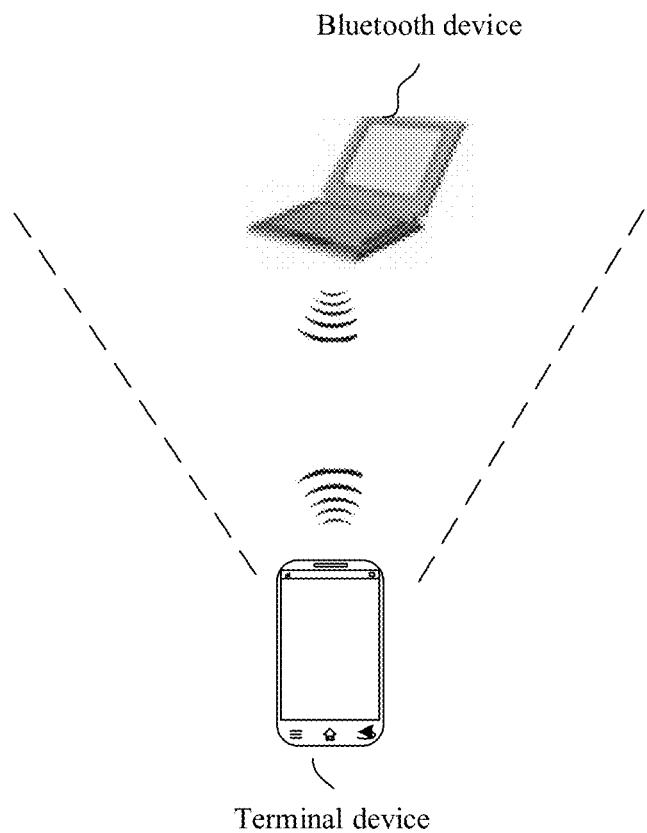
FIG. 2 is a diagram of a structure of a wireless communication system including a terminal device and a Bluetooth device according to an embodiment of this application.

The technical solutions of this application are applied to a wireless communication system. As shown in FIG. 2, the wireless communication system may include one terminal device and at least one Bluetooth device.

The Bluetooth device includes but is not limited to a mobile phone (mobile phone), a pad (Pad), a personal computer (personal computer, PC), a camera, a wearable device, a television, a sound box, an air conditioner, a vehicle, and a drone. A specific device form of the Bluetooth device is not limited in this embodiment of this application.

The terminal device includes but is not limited to a mobile phone (mobile phone), a pad (Pad), a personal computer (personal computer, PC), a camera, and a wearable device. The wearable device includes a smartwatch, a smart band, virtual reality (virtual reality, VR) or augmented reality (augmented reality, AR) glasses, or the like. A specific device form of the terminal device is not limited in this embodiment of this application. The terminal device is installed with but not limited to an IOS operating system, an Android operating system, a Windows operating system, a Linux operating system, or another operating system.

The terminal device has direction-finding and positioning functions. For example, the terminal device supports Bluetooth 5.1. Bluetooth 5.1 is a Bluetooth technical standard released by the Bluetooth special interest group (Bluetooth Special Interest Group, Bluetooth SIG), and includes a direction-finding function based on an angle of arrival (arrival of angle, AOA) and a direction-finding function based on an angle of departure (arrival of departure, AOD).

Embodiments of this application provide a wireless connection method. A Bluetooth device corresponding to a device in a capture screen of a terminal device is recognized in a Bluetooth device list, and a wireless connection is established to the Bluetooth device. In this method, a device name of a target device does not need to be memorized by a user, or the device name of the target device does not need to be searched for in the Bluetooth device list, thereby improving user experience.

Figure 3:
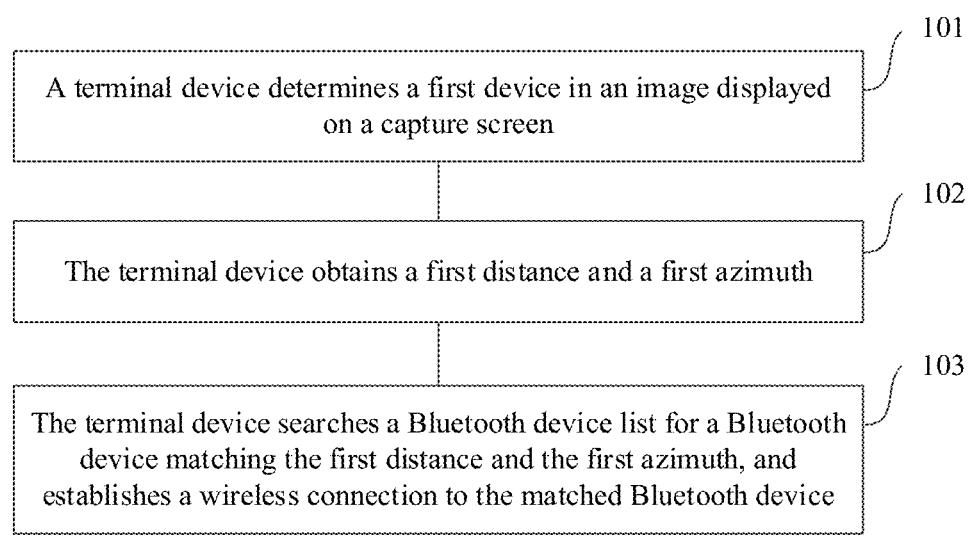
FIG. 3 is a flowchart of a wireless connection method according to an embodiment of this application.

The following uses an example in which a terminal device is a mobile phone to describe in detail a method provided in an embodiment of this application. As shown in FIG. 3, the method includes the following steps.

101: A terminal device determines a first device in an image displayed on a capture screen.

The capture screen may be a framed picture displayed in a display after a camera application is started. The capture screen may include one or more Bluetooth devices. For example, as shown in a left part of FIG. 4, the capture screen of the terminal device may include a mobile phone and a notebook computer.

When the capture screen includes a plurality of Bluetooth devices, a method for determining the first device in the capture screen includes but is not limited to the following several manners:

Manner 1: The first device is determined through an operation by a user. For example, the user can click an area in which the Bluetooth devices are located in the capture screen, and designate a Bluetooth device as the first device.

Manner 2: The first device is determined according to a preset rule. For example, a Bluetooth device that is located in a central area of the capture screen or that occupies a largest area in the capture screen is determined as the first device. Alternatively, the first device is determined based on a device type of a Bluetooth device. For example, it is assumed that a Bluetooth device whose device type is "mobile phone" is prior to a Bluetooth device whose device type is "computer" in the preset rule. As shown in the left part of FIG. 4, when the capture screen includes the mobile phone and the notebook computer, it is determined that the mobile phone is the first device.

102: The terminal device obtains a first distance and a first azimuth.

The first distance is a straight-line distance between a position of the terminal device and the first device. For example, when the terminal device has a binocular vision-based ranging function, the position of the terminal device is a midpoint of a connection line between two cameras (two eyes) of the terminal device, a position of the first device is a center of gravity of the first device, and the first distance is a distance between the midpoint of the connection line of the two eyes and the center of gravity of the first device. Optionally, the terminal device may obtain the first distance by using a binocular vision-based ranging method.

Similarly, if a time of flight (time of flight, TOF) camera is disposed on the terminal device, the first distance may be obtained through measurement by using the TOF camera. In this case, the position of the terminal device is a position of the TOF camera, and the first distance is a distance between the position of the TOF camera and the center of gravity of the first device. Specifically, a ranging method performed by using the TOF camera may be referred to as "a time of flight ranging method". A principle is that lighting is performed on a target object, for example, the first device, and a transmission time of light between a lens and the object is measured for ranging, so that a distance between the lens and the object is obtained. In this embodiment, the terminal device can measure a distance between the terminal device and each device in the capture screen by using the TOF camera.

It should be noted that, in addition to obtaining the first distance according to the binocular vision-based ranging method and through measurement by using the TOF camera, the terminal device may alternatively obtain the first distance in another manner, for example, based on a size of the first device in the capture screen. The method for obtaining the first distance is not limited in this embodiment.

For ease of description, in the following, the first distance is represented as "$d_{c1}$", and the first device is represented as "c1".

The first azimuth is an azimuth of the first device relative to the terminal device. For ease of description, the first azimuth is represented as θ1 in the following.

For example, the azimuth may be a horizontal included angle that is between a northing directional line of a point and a target directional line and that is in a clockwise direction. As shown in a right part of FIG. 4, N is a due north direction, O is the position of the terminal device, the first device is a mobile phone, the first azimuth θ1=360−γ, and γ is an angle that offsets in a northwest direction. It is assumed that the mobile phone offsets in the northwest direction by the angle γ=30°. Then an azimuth of the mobile phone relative to the terminal device is the first azimuth θ1=360°−30°=330°.

Figure 5:
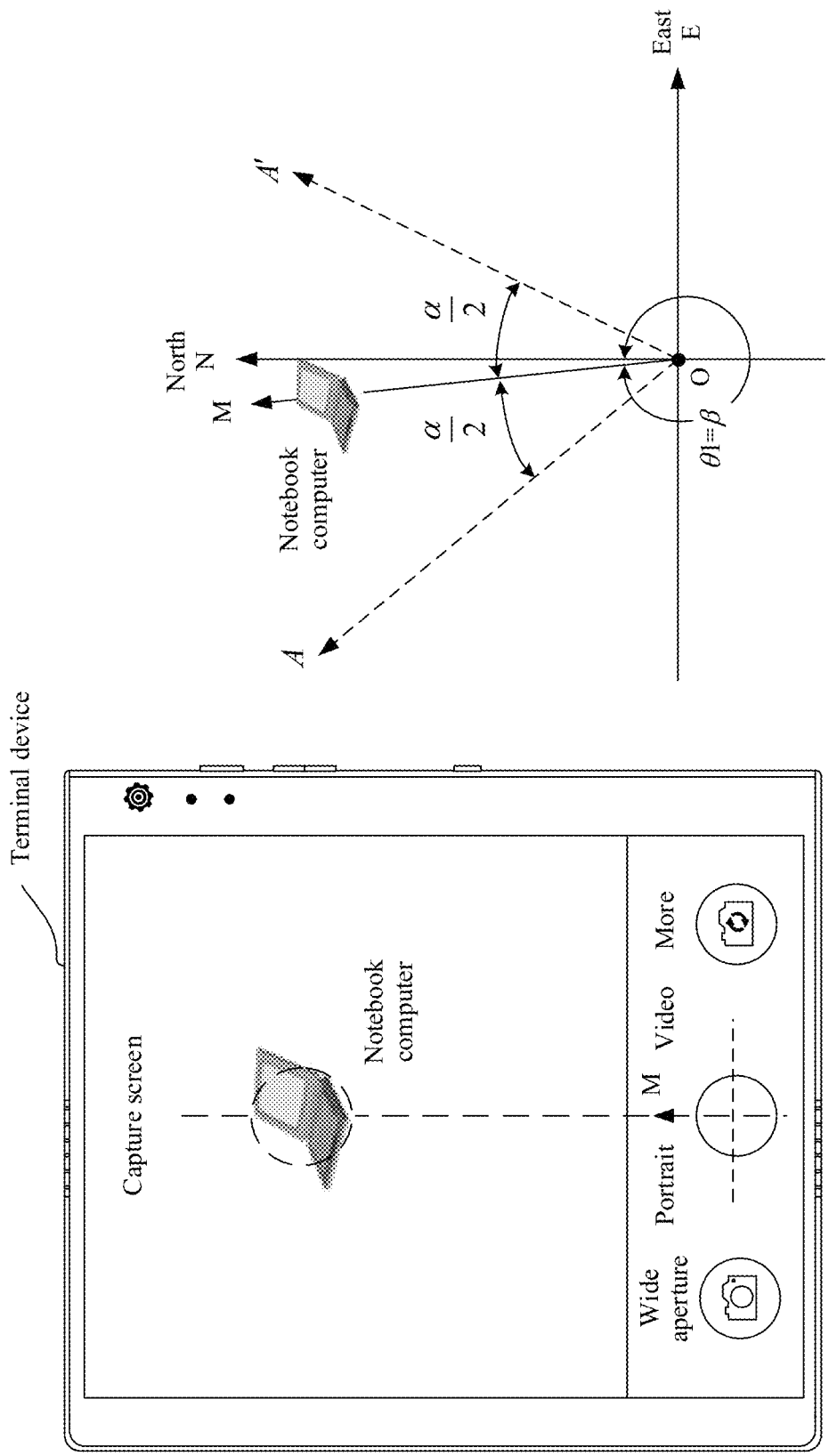
FIG. 5 is a schematic diagram of a first device and a first azimuth in another capture screen according to an embodiment of this application.

The first azimuth may be determined based on an attitude angle of the terminal device. Specifically, the first azimuth is equal to the attitude angle of the terminal device. As shown in FIG. 5, when the first device in the capture screen of the terminal device is a notebook computer, and the notebook computer is located in a center of the capture screen of the terminal device, it is determined that the first azimuth is equal to the attitude angle of the terminal device, where the attitude angle of the terminal device is an included angle that is between the due north direction and a position pointed by the terminal device and that is in the clockwise direction. As shown in a right part of FIG. 5, a direction that an arrow points to M is the attitude angle of the terminal device, N is the due north direction, the attitude angle of the terminal device is represented as β, and the first azimuth θ1=β=∠NOM Optionally, the first azimuth may be alternatively determined based on the attitude angle of the terminal device, an angle of view of the capture screen, and a relative position of the first device in the capture screen.

The attitude angle β of the terminal device may be obtained by using an acceleration sensor, a gyroscope sensor, and the like that are mounted on the terminal device.

Figure 4:
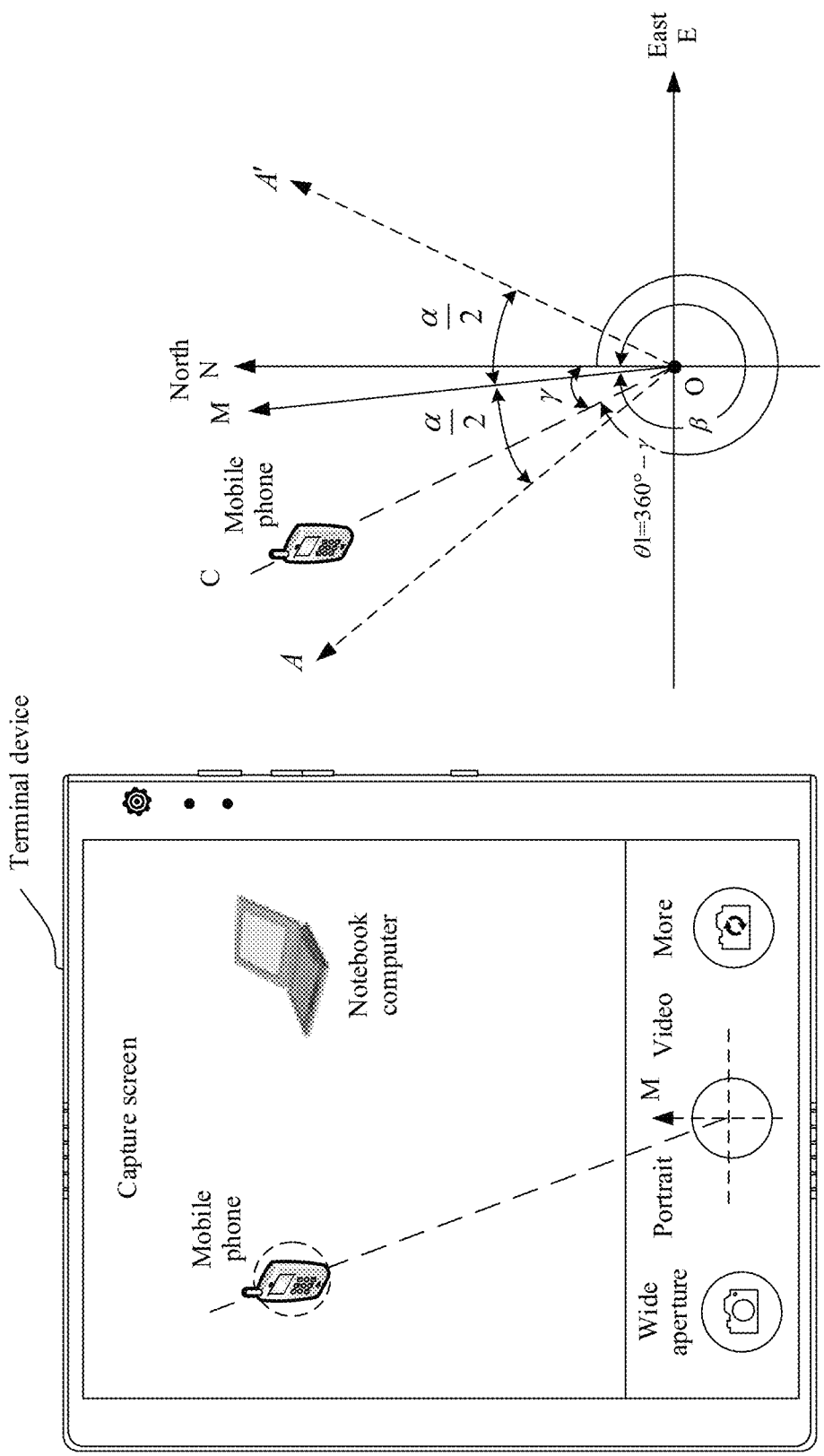
FIG. 4 is a schematic diagram of a first device and a first azimuth in a capture screen according to an embodiment of this application.

The angle of view of the capture screen is determined based on a focal length of a camera or a camera of the terminal device, and the angle of view of the capture screen is represented as α. As shown in FIG. 4 and FIG. 5, α=∠AOA' and ∠AOM=∠MOA'=α/2.

Figure 6A:
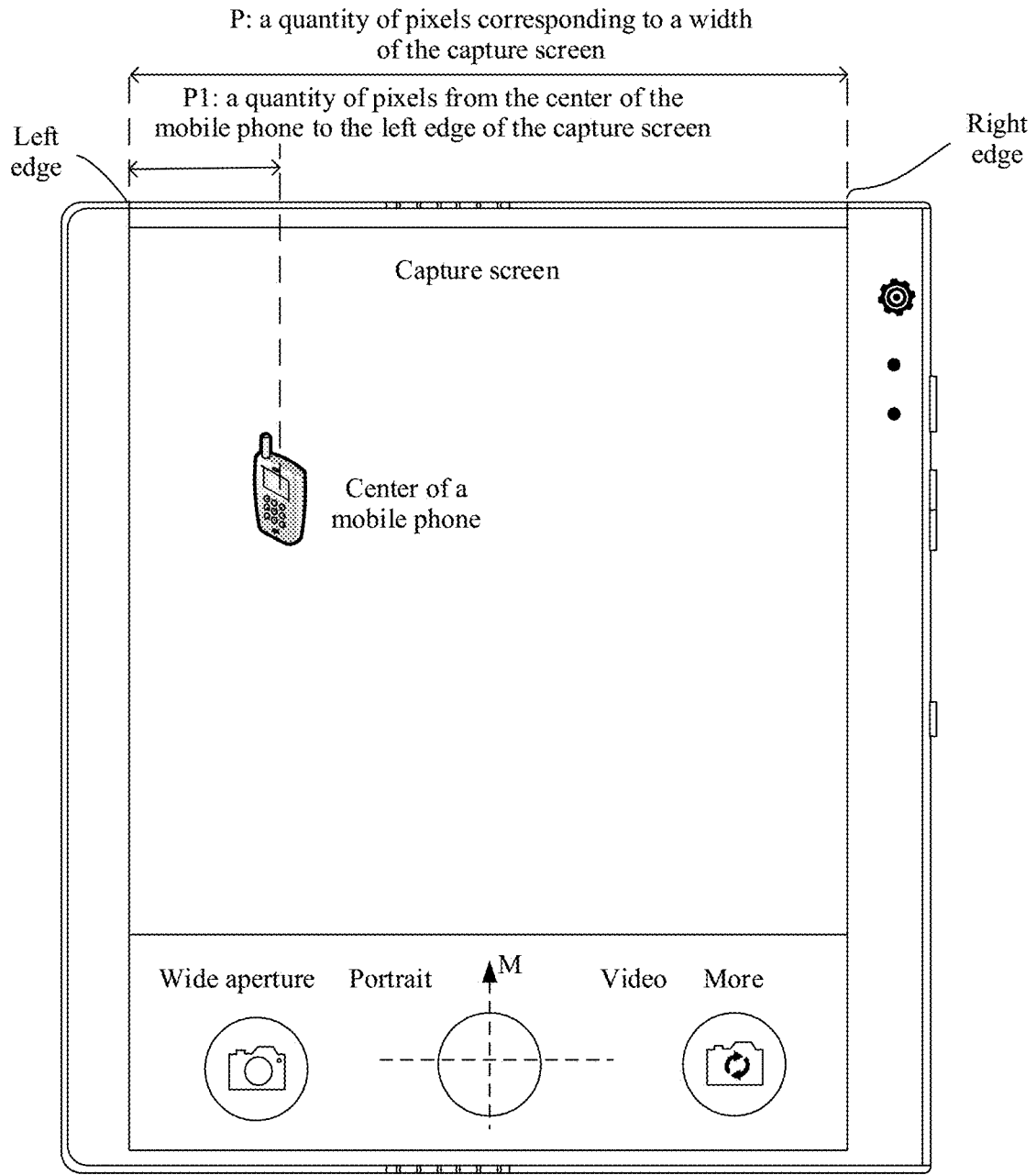
FIG. 6A is a schematic diagram of a quantity of pixels from a center of a mobile phone to a left edge of a capture screen according to an embodiment of this application.

The relative position of the first device in the capture screen may be determined based on a quantity of pixels. For example, as shown in FIG. 6A, when a quantity of pixels corresponding to a width of the capture screen is P, the relative position of the first device in the capture screen is P1/P. For example, the first device is a mobile phone. P1 is a quantity of pixels from a center of the mobile phone in the capture screen to a left edge of the capture screen.

In this case, the first azimuth $$\theta 1 = \beta + \left(\frac{P1}{P} - \frac{1}{2}\right) \times \alpha.$$

θ1 is the first azimuth, α is the angle of view of the capture screen, and β is the attitude angle of the terminal device.

It should be noted that if a value of $$\beta + \left(\frac{P1}{P} - \frac{1}{2}\right) \times \alpha$$

is greater than 360°, a calculation result needs to be subtracted by 360° to obtain the first azimuth $$\theta 1 = \beta + \left(\frac{P1}{P} - \frac{1}{2}\right) \times \alpha - 360°.$$

It may be understood that when the first device is located in the center of the capture screen, the relative position of the first device in the capture screen is $$\frac{P1}{P} = \frac{1}{2}.$$

In this case, the same as that shown in FIG. 5, the first azimuth θ1=β.

Figure 6B:
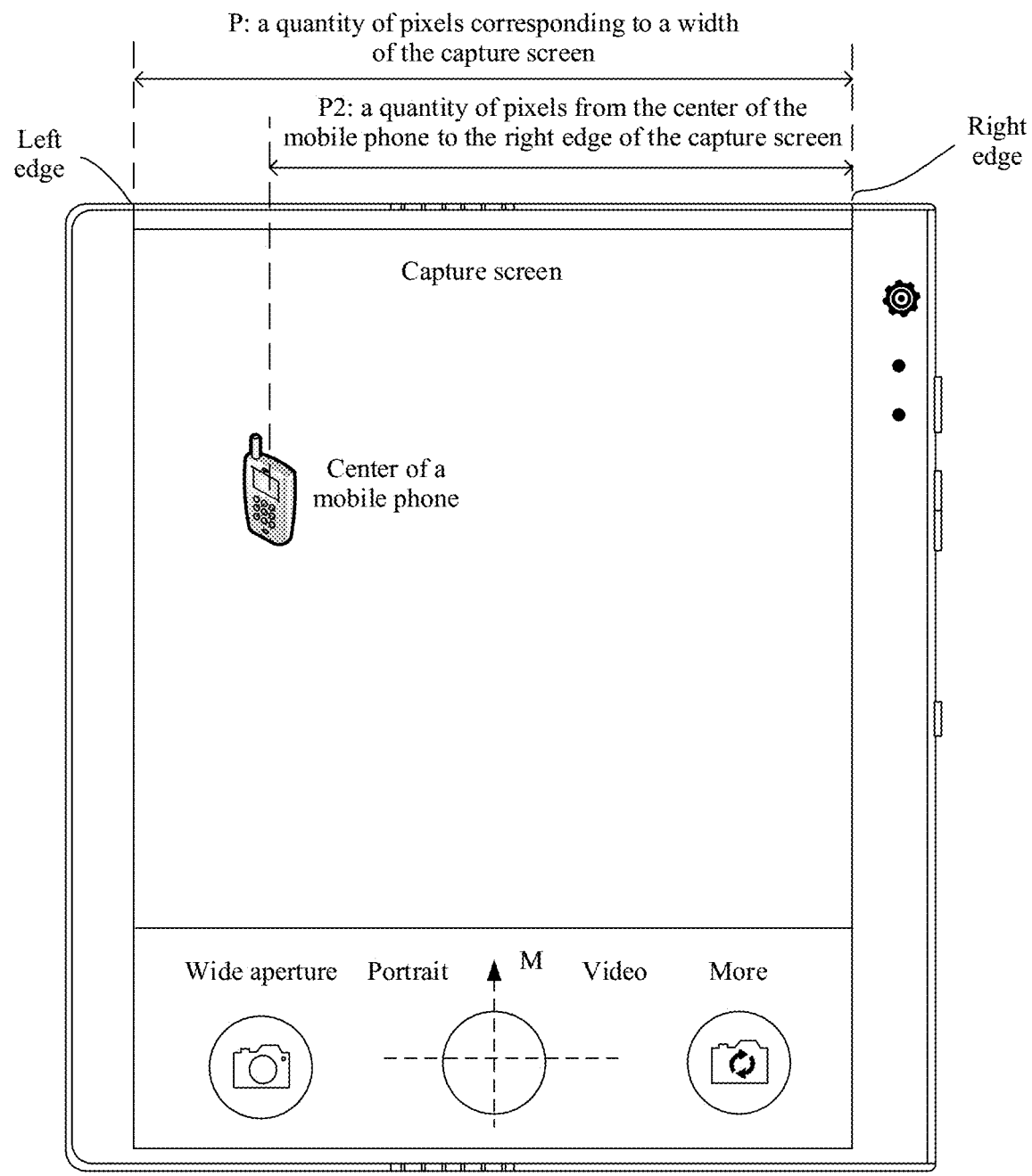
FIG. 6B is a schematic diagram of a quantity of pixels from a center of a mobile phone to a right edge of a capture screen according to an embodiment of this application.

It should be noted that, in this example, that P1 is from the center of the mobile phone to the left edge of the capture screen is used as an example for description. It may be understood that if the relative position of the first device in the capture screen is P2/P, and the first device is the mobile phone, P2 is a quantity of pixels from the center of the mobile phone to a right edge of the capture screen. As shown in FIG. 6B, in this case, a formula for calculating the first azimuth is:

$$\theta 1 = \beta + \left(\frac{1}{2} - \frac{P2}{P}\right) \times \alpha.$$

It should be noted that, in this embodiment, that the attitude angle β of the terminal device is left or right relative to the due north direction N or faces the due north direction is used as an example for description. Alternatively, an example in which the attitude angle β offsets upward or downward relative to a horizontal direction, for example, a due east direction E, may be used for description. This is not limited in this application.

103: The terminal device searches a Bluetooth device list for a Bluetooth device matching the first distance and the first azimuth, and establishes a wireless connection to the matched Bluetooth device.

Specifically, the step 103 includes:

103-1: Obtain a second distance and a second azimuth between the Bluetooth device in the Bluetooth list and the terminal device.

The second distance is a distance that is between an antenna array on the terminal device and an antenna array on the Bluetooth device and that is measured by using a Bluetooth positioning function; and the second azimuth is an azimuth that is of the Bluetooth device relative to the terminal device and that is measured by using a Bluetooth direction-finding function. For ease of description, in the following, the second distance is represented as $d_B$, and the second azimuth is represented as θ2.

Figure 7:
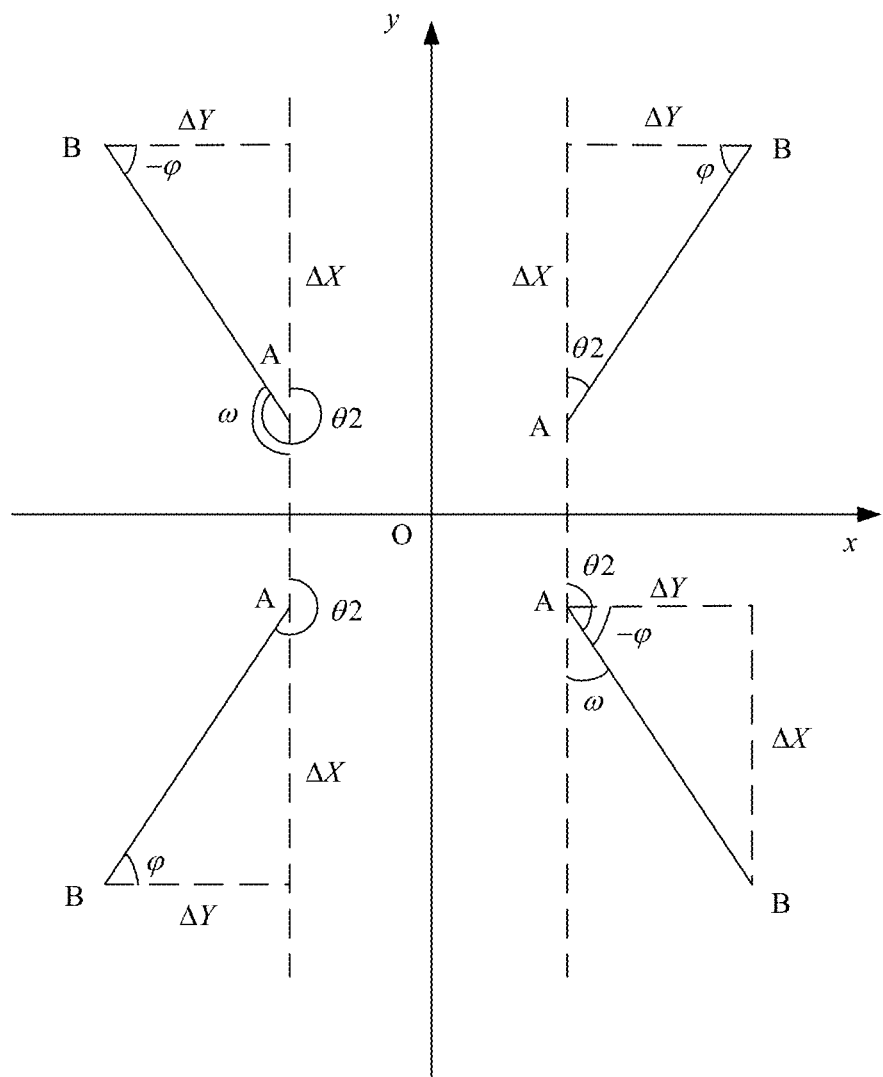
FIG. 7 is a schematic diagram of a second azimuth of a Bluetooth device according to an embodiment of this application.

For example, as shown in FIG. 7, it is assumed that a point A is the terminal device, coordinates are $(X_A, Y_A)$, a point B is the Bluetooth device, and coordinates are $(X_B, Y_B)$. Then the second azimuth θ2 is:

(1) If $X_B>0$, $Y_B>0$ and $\Delta Y>0$, φ>0 (located in a first quadrant), the second azimuth θ2=90°−φ.

(2) If $X_B>0$, $Y_B<0$ and $\Delta Y>0$, φ<0 (located in a second quadrant), the second azimuth θ2=180°−ω=180°−(90°+φ).

(3) If $X_B<0$, $Y_B<0$ and $\Delta Y<0$, φ>0 (located in a third quadrant), the second azimuth θ2=180°+(90°−φ).

(4) If $X_B<0$, $Y_B>0$ and $\Delta Y<0$, φ<0 (located in a fourth quadrant), the second azimuth θ2=180°+ω180°+(90°−φ).

(5) If $Y_B=0$ and $\Delta X=0$, $\Delta Y\neq 0$ (located on an X-axis), the second azimuth θ2 is equal to 900 or 270°.

(6) If $X_B=0$ and $\Delta Y=0$ (located on a y-axis), and $\Delta Y$ approaches an infinitesimal quantity, the second azimuth θ2 is equal to 0° or 180°.

$\Delta X = X_B - X_A$, $\Delta Y = Y_B - Y_A$, and φ=arctan($\Delta X/\Delta Y$).

Optionally, the second distance $d_B = \sqrt{\Delta X^2 + \Delta Y^2}$.

It should be understood that, in this method, only an example in which the second distance and the second azimuth are determined based on position coordinates of the Bluetooth device and position coordinates of the terminal device is provided. In addition, the second distance and the second azimuth may be alternatively determined by using another method. This is not limited in this embodiment.

Therefore, the terminal device obtains a device name of each Bluetooth device, a second distance between each Bluetooth device and the terminal device, and a second azimuth of each Bluetooth device, and generates and stores the Bluetooth device list. That is, the Bluetooth device list may include information such as the device name of each Bluetooth device, the second distance $d_B$ between each Bluetooth device and the terminal device, the second azimuth θ2 of each Bluetooth device, and a correspondence among the three.

103-2: Determine whether a distance difference between the first distance and the second distance is not greater than a first preset value, and whether an azimuth difference between the first azimuth and the second azimuth is not greater than a second preset value.

Specifically, the first preset value is $d_{preset}$, and the second preset value is $\theta_{preset}$. The distance difference between the first distance and the second distance is Δd, that is $\Delta d = |d_{c1} -$ $d_B|$, and the azimuth difference between the first azimuth and the second azimuth is $\Delta\theta=|\theta1-\theta2|$. In this step, it is determined whether $\Delta d \leq d_{preset}$ and $\Delta\theta \leq \theta_{preset}$ are met.

103-3: If both $\Delta d \leq d_{preset}$ and $\Delta\theta \leq \theta_{preset}$ are met, determine that the Bluetooth device matches the first device in the capture screen. Therefore, a correspondence between the first device in the capture screen and the Bluetooth device in the Bluetooth device list can be established, to learn that the first device in the capture screen is the matched Bluetooth device in the Bluetooth device list, and that a device name of the matched Bluetooth device is a device name of the first device.

For example, it is assumed that the first azimuth $\theta1=330°$, $d_{preset}=5$ cm, and $\theta_{preset}=3°$. If a Bluetooth device that meets a condition that $\Delta d$ does not exceed 5 cm and $\Delta\theta$ does not exceed 3° exists in the Bluetooth device list, it is determined that the Bluetooth device is the first device in the capture screen.

It may be understood that, in the step 103-2, if the distance difference $\Delta d > d_{preset}$ or/and the azimuth difference $\Delta\theta > \theta_{preset}$, it is determined that the Bluetooth device in the Bluetooth device list does not match the first device, that is, the Bluetooth device is not the first device. Another Bluetooth device in the Bluetooth device list is selected to determine whether the Bluetooth device matches the first device, until a Bluetooth device that matches the first device is searched for in the Bluetooth device list. For a specific search process, refer to the step 103-1 to the step 103-3.

Optionally, if the terminal device does not find the Bluetooth device that matches the first device after traversing all Bluetooth devices in the Bluetooth device list, it indicates that the first device is not a Bluetooth device in the Bluetooth device list. In this case, the terminal device may prompt the user to enable a Bluetooth function of the first device, or indicate that no Bluetooth device is found.

Figure 8:
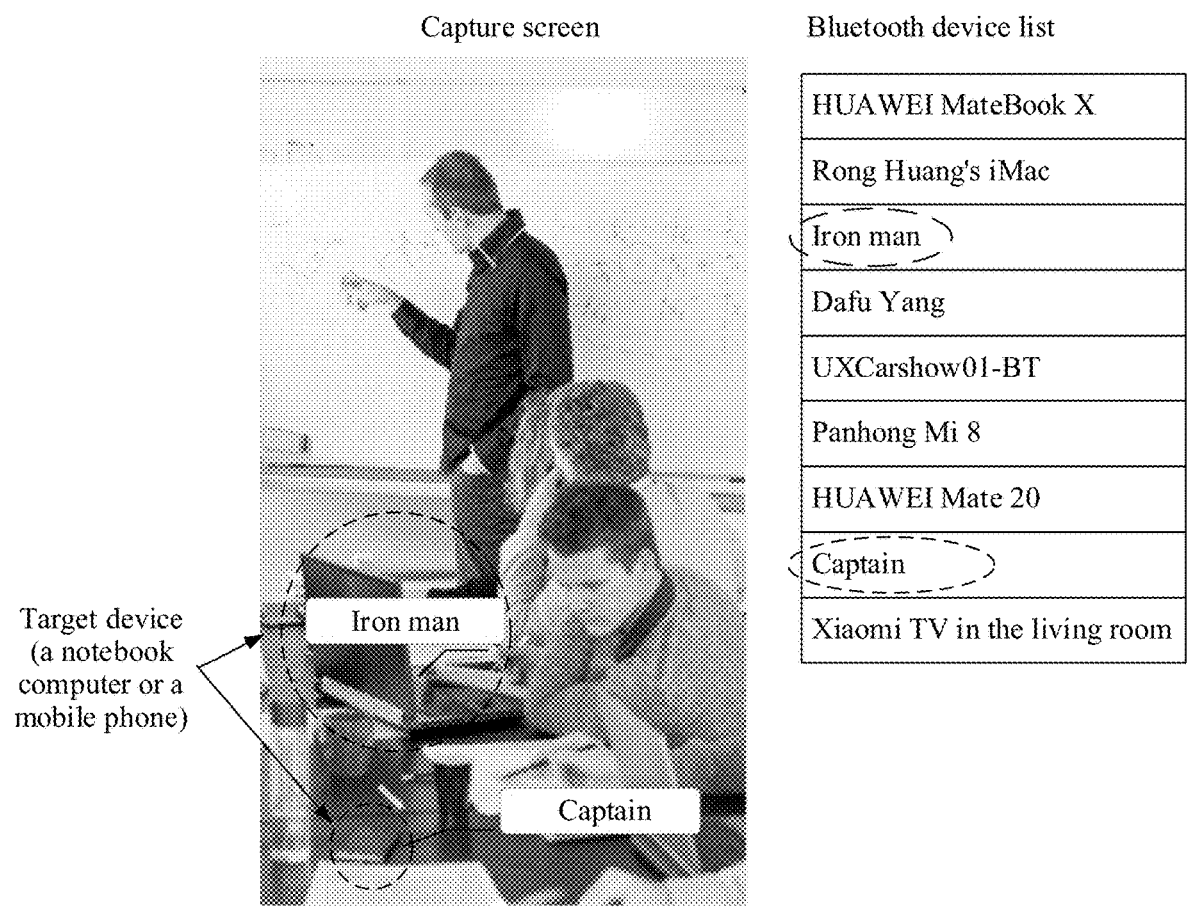
FIG. 8 is a schematic diagram of searching a Bluetooth device list for a target device according to an embodiment of this application.

Optionally, after searching for the Bluetooth device that matches the first device, the terminal device may display the device name of the Bluetooth device on the capture screen. As shown in FIG. 8, it is assumed that a target device is a notebook computer, and a device name of a Bluetooth device that matches the notebook computer is "Iron man" in the Bluetooth device list. The terminal device displays the device name "Iron man" of the notebook computer on the capture screen. Once the user clicks the device name, a wireless connection between the terminal device and "Iron man" can be established.

It should be noted that, in the foregoing embodiment, that one target device in the capture screen is recognized is used as an example for description. It may be understood that when the capture screen of the terminal device includes a plurality of target devices, the plurality of target devices may be all recognized. For example, as shown in FIG. 8, the target devices include a notebook computer and a mobile phone. The terminal device recognizes both the notebook computer and the mobile phone, and determines that a device name of the notebook computer in the capture screen is "Iron man" and a device name of the mobile phone is "Captain".

According to the method provided in this embodiment, the terminal device obtains the first distance and the first azimuth that are related to the first device in the capture screen, obtains the second distance and the second azimuth of the Bluetooth device in the Bluetooth device list by using a direction-finding and positioning technology of Bluetooth 5.1, and compares the first distance and the first azimuth with the second distance and the second azimuth, to search the Bluetooth device list for the Bluetooth device that matches the first device in the capture screen. In this way, a wireless connection is established between the target device in the capture screen and the matched Bluetooth device in the Bluetooth device list. This prevents the user from searching, by using a device name, the Bluetooth device list for a device that needs to be connected, and simplifies an operation of the user.

Figure 9:
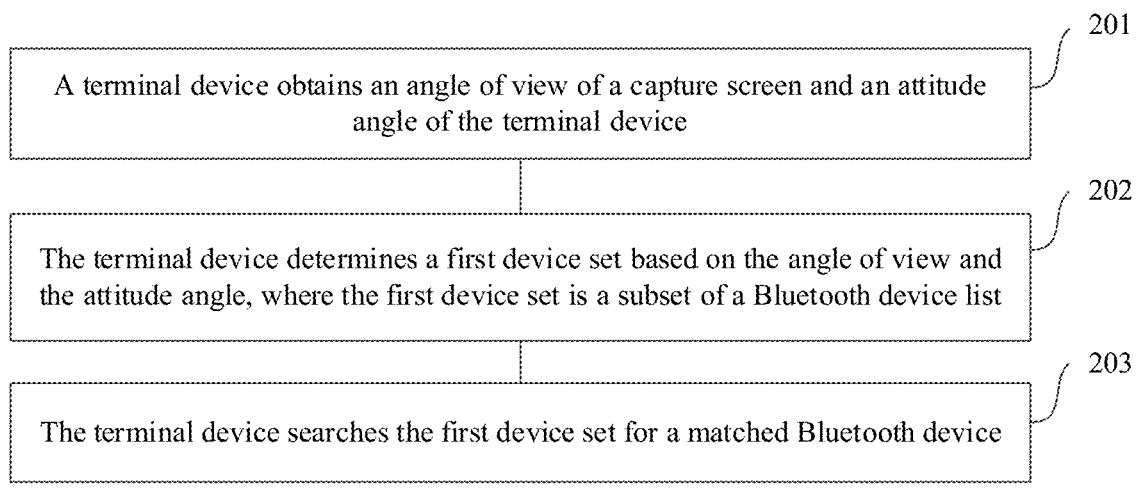
FIG. 9 is a flowchart of searching a first device set for a target device according to an embodiment of this application.

It should be noted that, in the foregoing embodiment, that the Bluetooth devices in the Bluetooth device list are sequentially traversed to search for the Bluetooth device that matches the first device is used as an example for description. Alternatively, the terminal device may select some Bluetooth devices from the Bluetooth device list first, and search the selected Bluetooth devices for the Bluetooth device that matches the first device. Specifically, as shown in FIG. 9, the step 103 may specifically include:

201: The terminal device obtains the angle of view of the capture screen and the attitude angle of the terminal device. For a detailed process, refer to the step 102 in the foregoing embodiment. Details are not described herein again.

202: The terminal device determines a first device set based on the angle of view and the attitude angle, where the first device set is a subset of the Bluetooth device list.

Specifically, the terminal device first determines a preset angle range based on the angle of view $\alpha$ of the capture screen and the attitude angle $\beta$ of the terminal device, and then determines that the first device set includes all devices whose Bluetooth coverage falls within the preset angle range.

Figure 10A:
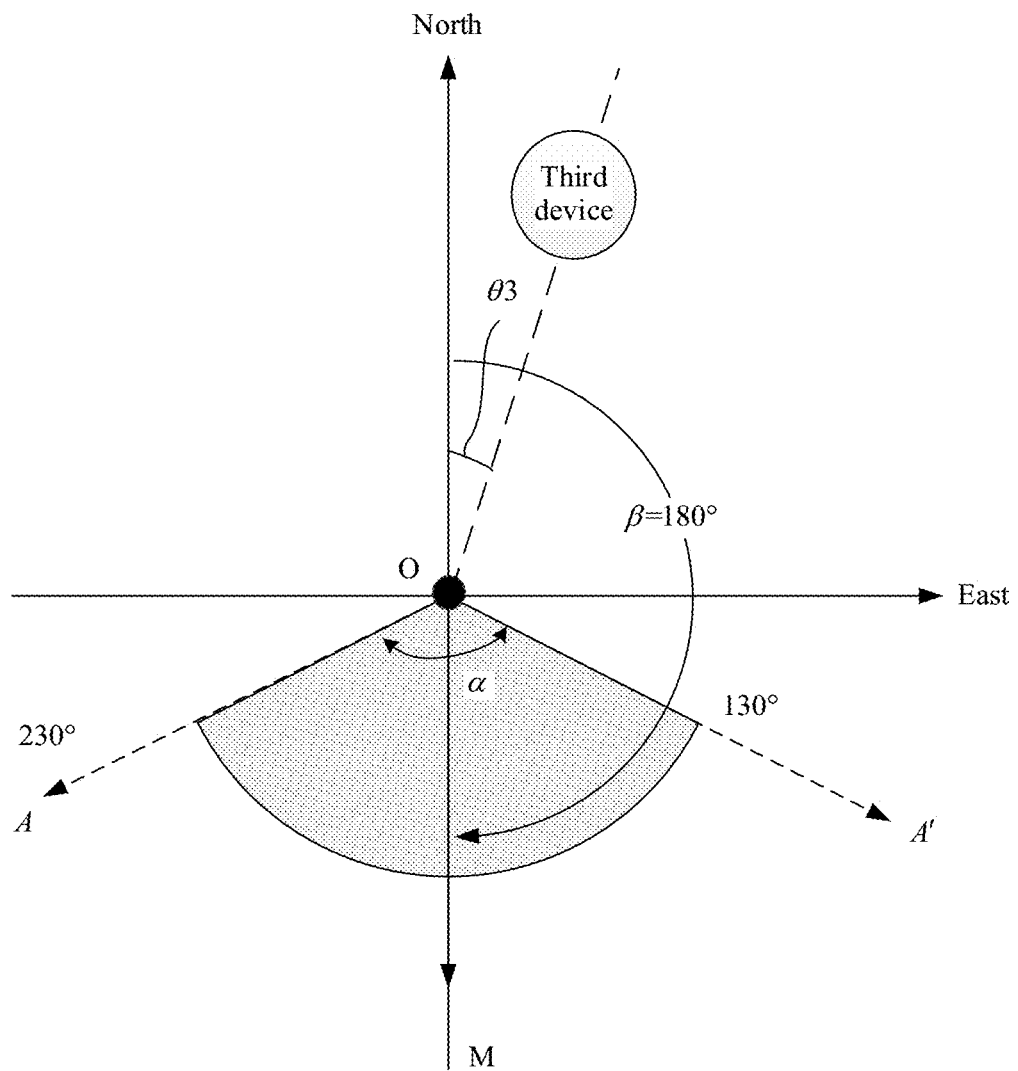
FIG. 10A is a schematic diagram of a preset angle range according to an embodiment of this application.

When $\beta+\alpha/2 \leq 360°$, the preset angle range is $[\beta-\alpha/2, \beta+\alpha/2]$. As shown in FIG. 10A, it is assumed that $\beta=180°$ and $\alpha=100°$. The terminal device determines that end values of the preset angle range are $\beta-\alpha/2=180°-100°/2=130°$ and $\beta+\alpha/2=180°+100°/2=230°$. In this case, the preset angle range is (130° to 230°) and includes the end values. Further, the first device set includes all devices whose Bluetooth coverage falls within (130° to 230°) For example, in FIG. 10A, there is a Bluetooth device in the Bluetooth device list, for example, a third device. An azimuth of the third device is $\theta3$, and $\theta3=30°$, which is not within the preset angle range. Therefore, the third device is not in the first device set of the range (130° to 230°).

Figure 10B:
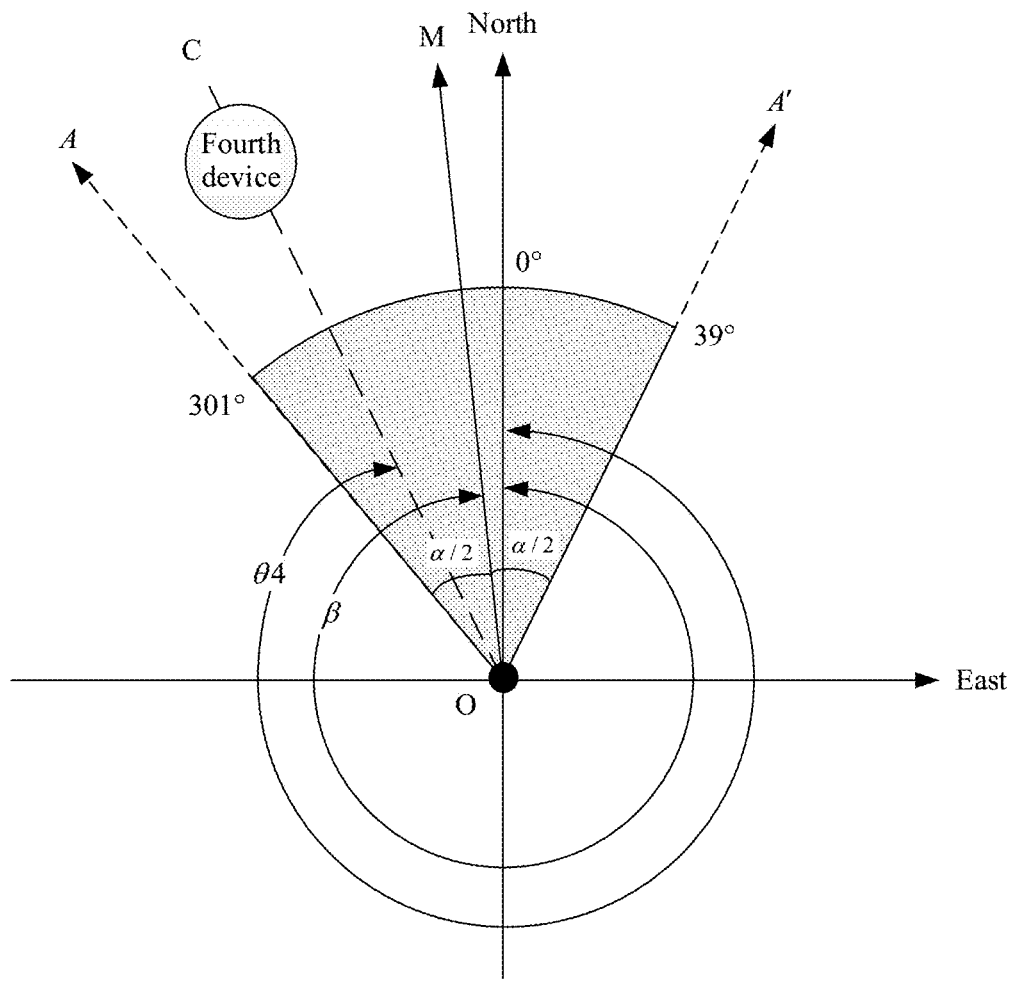
FIG. 10B is a schematic diagram of another preset angle range according to an embodiment of this application.

When $\beta+\alpha/2 > 360°$ the preset angle range is a union set of $[0, \beta+\alpha2-360°]$ and $[\beta-\alpha/2, 360°]$. As shown in FIG. 10B, it is assumed that $\beta=350°$ and $\alpha=100°$. The terminal device determines that end values of the preset angle range are $\beta+\alpha/2-360°=350°+100°/2-360°=40°$ and $\beta-\alpha/2=350°-100°/2=300°$. In this case, the preset angle range is formed by remaining angles other than the angle range (40° to 300°) in 360°, that is, the preset angle range is a union set of two angle ranges (0 to 39°) and (301° to 360°). Further, the first device set includes all devices whose Bluetooth coverage falls within (0 to 39°) and (301° to 360°). For example, in FIG. 10B, it is assumed that an azimuth of a fourth device in the Bluetooth device list is $\theta4$, and $\theta4=330°$, which is within the preset angle range. Therefore, the fourth device is in the first device set of the ranges (0 to 39°) and (301° to 360°).

203: The terminal device searches the first device set for the matched Bluetooth device.

Specifically, the Bluetooth device that matches the first distance and the first azimuth of the first device may be searched for in the first device set according to the method of the steps 103-1 to 103-3. Details are not described herein again.

In this embodiment, a recognition range is narrowed from all the devices in the Bluetooth device list to the first device set related to the angle of view α of the capture screen, and devices outside a range of the angle of view α are no longer searched. Therefore, a quantity of to-be-recognized devices in the Bluetooth device list is reduced, and search efficiency is improved.

Optionally, the method may further include: The terminal device obtains feature information of a first user in the capture screen.

The feature information of the first user includes facial features of the first user, such as an eye feature, an eyebrow feature, an ear feature, a nose feature, and a mouth feature. Optionally, the terminal device may obtain the facial features of the first user by using a facial recognition technology. In addition, the feature information of the first user further includes information about the first user, such as a name, a phone number, and an E-mail.

Then the terminal device establishes a correspondence between the first device and the feature information of the first user.

Specifically, when there is only one user in the capture screen and the user is close to the first device, it is inferred that the user is using the first device, and it is further inferred that the user is a holder of the first device. Then a name of the holder is marked, and a correspondence between feature information of the user and the first device is established.

Figure 11:
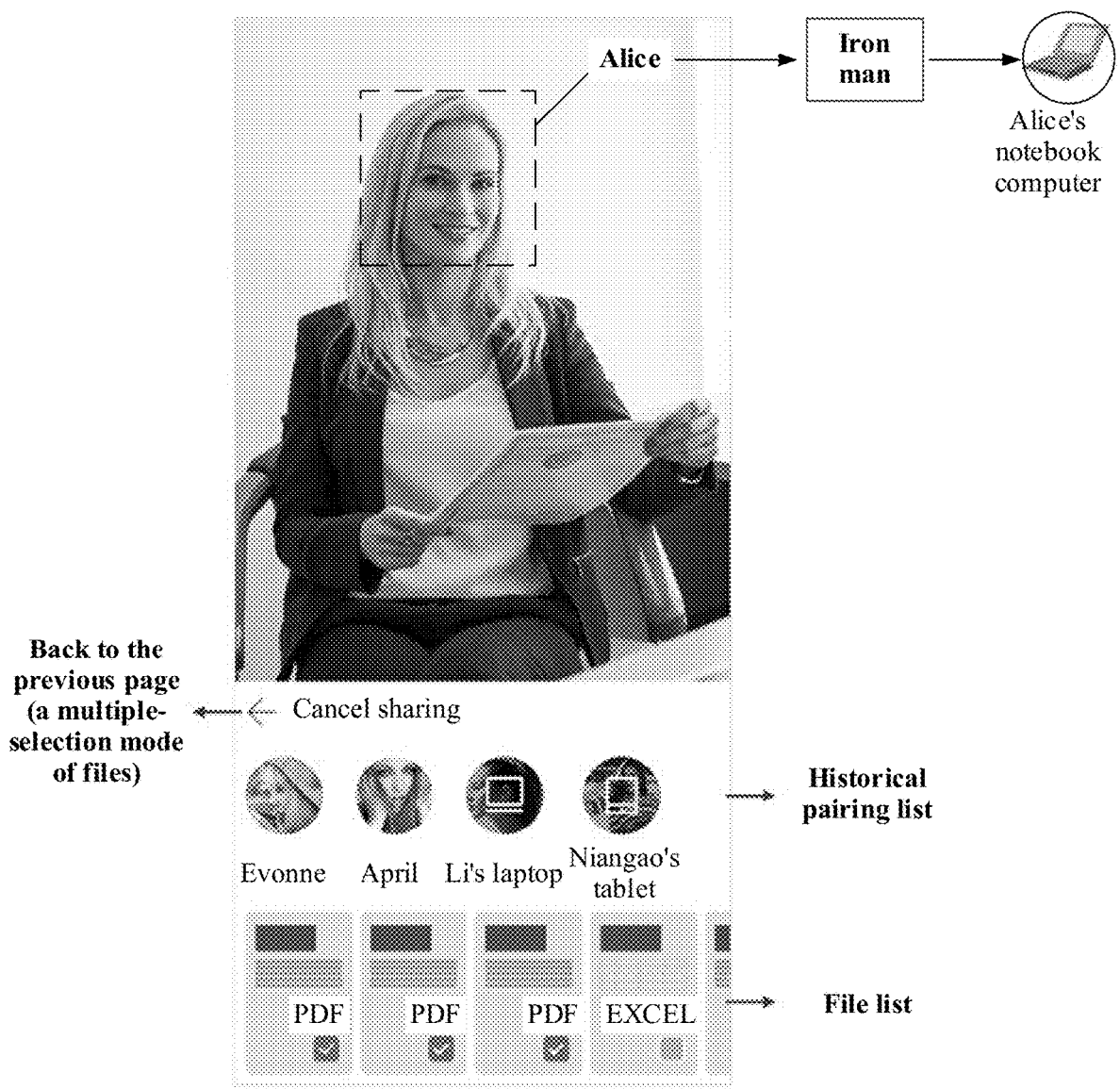
FIG. 11 is a schematic diagram of searching for a target device based on feature information of a user according to an embodiment of this application.

For example, as shown in FIG. 11, the user in the capture screen may be recognized by using the facial recognition technology. It is assumed that the name of the user is "Alice (Alice)". Then a correspondence between the name of the user and the first device is established. For example, if the device name of the first device is "Iron man", the established correspondence is "Alice-Iron man", and the correspondence is stored in the terminal device.

Then the terminal device establishes a wireless connection to the first device or transmits a file to the first device based on the feature information of the first user and the correspondence.

For example, when the terminal device subsequently needs to transmit a file to the first device, the terminal device only needs to recognize, by using the facial recognition technology, that the feature information of the first user in the capture screen is Alice, then the name Alice of the first user is popped up, and the device name "Iron man" of the first device bound to Alice is automatically popped up based on the pre-stored correspondence. Then an area in which Alice is located in the capture screen may be clicked, to establish a wireless connection between the terminal device and the device "Iron man" of Alice, transmit a file to the device of Alice, or the like.

In addition, the terminal device may alternatively display, in a historical pairing list, a Bluetooth device that has been connected to the terminal device. For example, the terminal device has been connected to a computer whose device name is "Captain", and a user bound to the computer is "Li". The terminal device may display, in the historical pairing list, an icon that includes a profile picture of Li and a picture of the computer, and a character identifier "Li's Laptop". The user can click the icon to establish a wireless connection between the terminal device and "Captain" or transmit a file to "Captain".

It should be noted that, if there are two or more users in the capture screen, a problem of how to select one of the users as a target user and establish a correspondence between the target user and the target device needs to be resolved. In one implementation, the user may manually select one of the two or more users, and then establish a correspondence. Similarly, if the capture screen includes a plurality of Bluetooth devices and a plurality of users, one of the users and one of the devices may be manually selected by the user, to establish a one-to-one correspondence. Alternatively, a user or a Bluetooth device may be selected by using a preset algorithm. A specific selection manner is not limited in this embodiment.

In this embodiment, feature information of a user in the capture screen may be recognized by using the facial recognition technology, and a correspondence between the feature information of the user and the target device is established. This facilitates subsequent re-connection or file transmission, and improves user experience.

The following describes an apparatus embodiment corresponding to the foregoing method embodiment.

Figure 12:
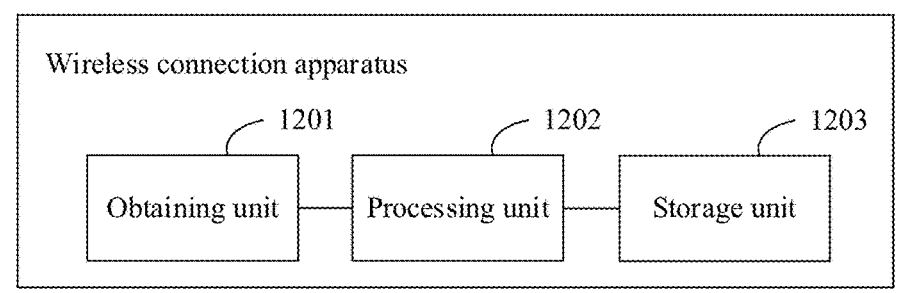
FIG. 12 is a schematic diagram of a structure of a wireless connection apparatus according to an embodiment of this application.

FIG. 12 is a schematic diagram of a structure of a wireless connection apparatus according to an embodiment of this application. The apparatus may be the terminal device in the foregoing embodiment, or a component located in the terminal device, for example, a chip. In addition, the apparatus may implement all functions of the terminal device in the foregoing embodiment.

Specifically, as shown in FIG. 12, the apparatus may include an obtaining unit 1201, a processing unit 1202, and a storage unit 1203. In addition, the apparatus may further include another unit or module, for example, a sending unit.

The processing unit 1202 is configured to determine a first device in an image displayed on a capture screen. The obtaining unit 1201 is configured to obtain a first distance and a first azimuth, search a Bluetooth device list for a Bluetooth device that matches the first distance and the first azimuth, and establish a wireless connection to the Bluetooth device. The first distance is a distance between the terminal device and the first device, and the first azimuth is an azimuth of the first device relative to the terminal device.

The obtaining unit 1201 may obtain the first distance by using a binocular vision-based ranging method or through measurement by using a time of flight TOF camera.

Optionally, in a specific implementation, the processing unit 1202 is specifically configured to search the Bluetooth device list for the Bluetooth device whose distance difference is not greater than a first preset value and whose azimuth difference is not greater than a second preset value. The distance difference is a difference between the first distance and a second distance, and the second distance is a distance that is between the terminal device and the Bluetooth device and that is measured by using a Bluetooth positioning function. The azimuth difference is a difference between the first azimuth and a second azimuth, and the second azimuth is an azimuth that is of the Bluetooth device relative to the terminal device and that is measured by using a Bluetooth direction-finding function.

Optionally, in another specific implementation, the processing unit 1202 is specifically configured to obtain an angle of view of the capture screen and an attitude angle of the terminal device, determine a first device set based on the angle of view and the attitude angle, and search the first device set for the Bluetooth device that matches the first distance and the first azimuth, where the first device set is a subset of the Bluetooth device list.

The first device set includes all devices within a preset angle range. Specifically, when $\beta+\alpha/2 \leq 360°$, the preset angle range is $[\beta-\alpha/2, \beta+\alpha/2]$; and when $\beta+\alpha/2 > 360°$, the preset angle range is a union set of $[0, \beta+\alpha/2-360°]$ and $[\beta-\alpha/2, 360°]$, where α is the angle of view of the capture screen, and β is the attitude angle of the terminal device.

Optionally, the first azimuth may be determined based on the attitude angle of the terminal device, for example, the first azimuth $\theta1=\beta$, and $\beta$ is the attitude angle of the terminal device.

Alternatively, the first azimuth is determined based on the angle of view of the capture screen, the attitude angle of the terminal device, and a relative position of a center of the first device in the capture screen.

For example, the first azimuth $$\theta1 = \beta + \left(\frac{P1}{P} - \frac{1}{2}\right) \times \alpha.$$

$\theta1$ is the first azimuth, $\alpha$ is the angle of view of the capture screen, $\beta$ is the attitude angle of the terminal device, P1 is a quantity of pixels from the center of the first device in the capture screen to a left edge of the capture screen, P is a quantity of pixels corresponding to a width of the capture screen, and P1/P is the relative position of the first device in the capture screen.

When the relative position of the first device in the capture screen is P2/P, P2 is a quantity of pixels from the center of the first device to a right edge of the capture screen, and a formula for calculating the first azimuth is $$\theta1 = \beta + \left(\frac{1}{2} - \frac{P2}{P}\right) \times \alpha.$$

Optionally, the obtaining unit 1201 is further configured to obtain feature information of a first user in the capture screen. The processing unit 1202 is further configured to establish a correspondence between the first device and the feature information of the first user, and store the correspondence in the storage unit 1203.

In addition, the processing unit 1202 is further configured to search, based on the feature information of the first user and the correspondence, for the first device corresponding to the first user, and establish a wireless connection to the first device.

In addition, in a specific hardware implementation, this embodiment further provides a terminal device, configured to implement the wireless connection method in the foregoing embodiment.

Figure 13:
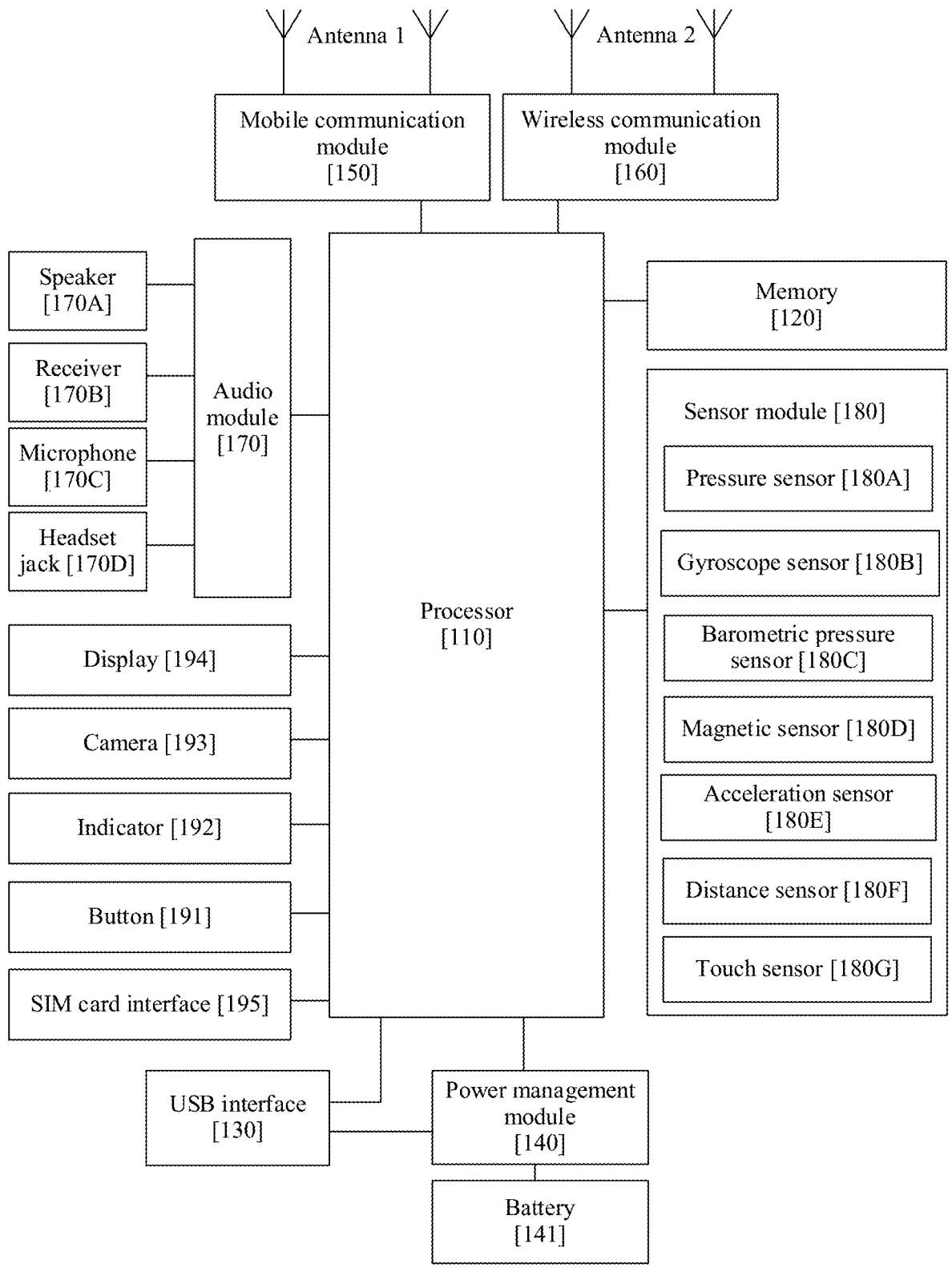
FIG. 13 is a schematic diagram of a structure of a terminal device according to an embodiment of this application.

Specifically, FIG. 13 is a schematic diagram of a structure of a terminal device. The terminal device may include a processor 110 and a memory 120. In addition, the terminal device further includes a USB interface 130, a power management module 140, a battery 141, an antenna 1, an antenna 2, a mobile communication module 150, a wireless communication module 160, an audio module 170, a speaker 170A, a telephone receiver 170B, a microphone 170C, a headset jack 170D, a sensor module 180, a button 191, an indicator 192, a camera 193, a display 194, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, and a touch sensor 180G. In addition, the sensor module 180 may further include a fingerprint sensor, a temperature sensor, an ambient light sensor, and the like.

It may be understood that the structure shown in this embodiment of the present invention does not constitute a specific limitation on the terminal device. In some other embodiments of this application, the terminal device may include more or fewer components than those shown in the figure, or some components may be combined, or some components may be split, or different component arrangements may be used. The components shown in the figure may be implemented by hardware, software, or a combination of software and hardware.

Specifically, the processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separated devices or may be integrated into one or more processors.

The memory may be alternatively disposed in the processor 110 to store instructions and data. In some embodiments, the memory in the processor 110 is a cache memory. The memory may store an instruction or data that has just been used or cyclically used by the processor 11o. If the processor 110 needs to use the instruction or the data again, the processor 110 may directly invoke the instruction or the data from the memory, to avoid repeated access and reduce waiting time of the processor 11o, thereby improving system.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The USB interface 130 is an interface that conforms to a USB standard specification, and may be specifically a mini USB interface, a micro USB interface, a USB type-C interface, or the like. The USB interface 130 may be configured to connect to a charger to charge the terminal device or transmit data to a peripheral device. Alternatively, the USB interface 130 may be configured to connect to another electronic device, for example, a headset.

The power management module 140 is configured to connect to the battery 141 and the processor 110. The power management module 140 supplies power to the processor 110, the memory 120, the display 194, the camera 193, the wireless communication module 160, and the like. In some embodiments, the power management module 140 may be disposed in the processor 110.

A wireless communication function of the terminal device may be implemented by using the antenna 1, the antenna 2, the mobile communication module 150, the wireless communication module 160, the modem processor, the baseband processor, and the like. Specifically, the antenna 1 and the antenna 2 each are configured to transmit and receive electromagnetic wave signals, and each antenna may be configured to cover a single or a plurality of communication bands. In addition, different antennas may be further multiplexed, to improve antenna utilization.

The mobile communication module 150 includes a module that has wireless communication functions such as 2G/3G/4G/5G. In addition, the mobile communication module 150 may further include at least one filter, a switch, a power amplifier, a low noise amplifier (low noise amplifier, LNA), and the like. In some embodiments, at least some functional modules in the mobile communication module 150 may be disposed in the processor 110.

The wireless communication module 160 may provide a wireless communication solution that includes wireless local area networks (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like and that is applied to the terminal device. The wireless communication module 160 may be one or more devices that integrate at least one communication processing module.

In some embodiments, the antenna 1 is coupled to the mobile communication module 150, and the antenna 2 is coupled to the wireless communication module 160, so that the terminal device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like.

The display 194 is configured to display an image, a video, and the like. In some embodiments, the terminal device may include one or N displays 194, and N is a positive integer greater than 1. In addition, the terminal device may implement a shooting function and a binocular vision-based ranging function by using the ISP, the camera 193, the video codec, the GPU, the display 194, the application processor, and the like. The ISP may be configured to process the image data collected by the camera 193. For example, when shooting is performed, a shutter is opened, light is transmitted to a photosensitive element of a camera through a lens, and an optical signal is converted into an electrical signal. The photosensitive element of the camera transmits the electrical signal to the ISP for processing, to convert the electrical signal into an image visible to naked eyes. In some embodiments, the ISP may be disposed in the camera 193. Optionally, the camera 193 is a TOF camera or a camera with a binocular vision-based ranging function.

The memory 120 may be configured to store computer-executable program code. The executable program code includes instructions. The internal memory 120 may include a program storage area and a data storage area. The program storage area may store an operating system, an application required by at least one function (for example, a voice playing function or an image playing function), and the like. The data storage area can store data (such as audio data and a phonebook) created during use of the terminal device, and the like. In addition, the memory 120 may include a high-speed random access memory, or may include a nonvolatile memory, for example, at least one magnetic disk storage device, a flash memory, or a universal flash storage (universal flash storage, UFS). The processor 110 executes various functional applications and data processing by running instructions stored in the internal memory 120 and/or instructions stored in the memory disposed in the processor.

The pressure sensor 180A is configured to sense a pressure signal, and may convert the pressure signal into an electrical signal. In some embodiments, the pressure sensor 180A may be disposed on the display 194. The gyroscope sensor 180B may be configured to determine a motion attitude of the terminal device. The barometric pressure sensor 180C is configured to measure a barometric pressure. The magnetic sensor 180D includes a Hall effect sensor. The terminal device may use the magnetic sensor 180D to detect opening/closing of a flip case. The acceleration sensor 180E may detect sizes of acceleration of the terminal device in various directions (usually in three axial directions). When the terminal device is still, the acceleration sensor 180E may detect a gravity size and a gravity direction. The acceleration sensor 180E may be further configured to recognize an attitude of the terminal device, and is applied to switching between a landscape mode and a portrait mode, a pedometer, and the like. The distance sensor 180F is configured to measure a distance. In some embodiments, in a shooting scenario, the terminal device may perform ranging by using the distance sensor 180F, to implement fast focusing. The touch sensor 180G is also referred to as a "touch device". The touch sensor 180G may be disposed in the display 194, and the touch sensor 180G and the display 194 constitute a touchscreen, which is also referred to as a "touchscreen". The touch sensor 180G is configured to detect a touch operation performed on or near the touch sensor 180G.

It should be understood that the sensor module 180 may obtain the parameters such as the first distance, the first azimuth, the second distance, and the second azimuth in the foregoing embodiment by using one or more of the gyroscope sensor 180B, the acceleration sensor 180E, the distance sensor 180F, the touch sensor 180G, and the like that are included in the sensor module 180.

The button 191 includes a power button, a volume button, and the like. The button 191 may be a mechanical button, or may be a touch button. The indicator 192 may be configured to indicate a charging status and a power change, or may be configured to indicate a message, a missed call, a notification, and the like. The SIM card interface 195 is configured to connect to a SIM card.

In this embodiment, when the terminal device serves as a wireless connection apparatus, the method steps shown in FIG. 3 and FIG. 9 in the foregoing embodiment may be implemented. In addition, in the apparatus shown in FIG. 12, functions of the obtaining unit 1201 may be implemented by components such as the mobile communication module 150, the wireless communication module 160, the sensor module 180, the camera 193, and the display 194. Functions to be implemented by the processing unit 1202 may be implemented by the processor 110. Functions of the storage unit 1203 may be implemented by the memory 120.

Optionally, in a possible implementation, the terminal device shown in FIG. 13 is, for example, AR glasses, and is applicable to an environment in which an augmented reality device is popularized in the future. When a user looks at a target device by using the AR glasses, the terminal device may be automatically connected to the target device, so that no further setting is required, and the target device is found from a Bluetooth device list for matching. The terminal device may help the user complete matching between the target device in the capture screen and a device name in the Bluetooth device list, to achieve a beneficial effect that what you see is what you get.

In addition, an embodiment of this application further provides a wireless communication system. The system includes one terminal device and at least one Bluetooth device. The terminal device may be the terminal device shown in FIG. 13, and is configured to implement the wireless connection method in the foregoing embodiment. A structure of each Bluetooth device may be the same as or different from a structure of the terminal device shown in FIG. 13. The structure and a specific form of each Bluetooth device are not limited in this embodiment.

In addition, an embodiment of this application further provides a computer storage medium, where the computer storage medium may store a program, and when the program is executed, some or all of the steps of the wireless connection method provided in this application may be included. The storage medium includes but is not limited to a magnetic disk, an optical disc, a read only memory (read only memory, ROM), and a random access memory (random access memory, RAM).

All or some of the foregoing embodiments may be implemented by using software, hardware, firmware, or any combination thereof. When software is used to implement embodiments, embodiments may be implemented completely or partially in a form of a computer program product.

The computer program product includes one or more computer instructions, such as a pairing instruction and a transmission instruction. When the computer loads and executes the computer program instructions, all or some of the method procedures or functions described in the foregoing embodiments of this application are generated. The computer may be a general-purpose computer, a dedicated computer, a computer network, or other programmable apparatuses. The computer instructions may be stored in a computer-readable storage medium or transmitted from one computer-readable storage medium to another computer-readable storage medium.

The terms "first", "second", and the like in this specification, claims, and the foregoing accompanying drawings of this application are used to distinguish between similar objects, for example, the first device generally refers to any device in the capture screen, and does not specifically refer to a specific device in the capture screen. In addition, the terms "include" and "comprise", as well as any variation thereof, are intended to cover inclusion without exclusion.

For a same or similar part between embodiments in this specification, refer to each other. Especially, embodiments of the wireless connection apparatus and the terminal device are basically similar to the method embodiment, and therefore is described briefly; for related parts, refer to descriptions in the method embodiment.

The foregoing descriptions are implementations of this application, but are not intended to limit the protection scope of this application.

What is claimed is:

1. A method, comprising:
    determining, by a terminal device, a first device in an image displayed on a capture screen;
    obtaining, by the terminal device, a first distance and a first azimuth based on the image, wherein the first distance is between the terminal device and the first device, and the first azimuth is of the first device relative to the terminal device; and
    searching, by the terminal device, a Bluetooth device list for a Bluetooth device matching the first distance and the first azimuth, and establishing a wireless connection to the Bluetooth device,
    wherein the searching the Bluetooth device list for the Bluetooth device comprises:
        searching the Bluetooth device list for the Bluetooth device whose distance difference is less than or equal to a first preset value and whose azimuth difference is less than or equal to a second preset value,
        wherein the distance difference of the Bluetooth device is between the first distance and a second distance, the second distance is between the terminal device and the Bluetooth device and measured by using a Bluetooth positioning function, the azimuth difference is between the first azimuth and a second azimuth, and the second azimuth is of the Bluetooth device relative to the terminal device and measured by using a Bluetooth direction-finding function.

2. The method according to claim 1, wherein the searching the Bluetooth device list for the Bluetooth device comprises:
    obtaining, by the terminal device, an angle of view of the capture screen and an attitude angle of the terminal device;
    determining, by the terminal device, a first device set based on the angle of view and the attitude angle, wherein the first device set is a subset of the Bluetooth device list; and
    searching, by the terminal device, the first device set for the Bluetooth device.

3. The method according to claim 2, wherein the determining the first device set based on the angle of view and the attitude angle comprises:
    determining, by the terminal device, a preset angle range based on the angle of view and the attitude angle; and
    determining that the first device set comprises all devices within the preset angle range,
    wherein, when $\beta+\alpha/2 \leq 360°$, the preset angle range is $[\beta-\alpha/2, \beta+\alpha/2]$,
    wherein, when $\beta+\alpha/2 > 360°$, the preset angle range is a union set of $[0, \beta+\alpha/2-360°]$ and $[\beta-\alpha/2, 360°]$, and
    wherein "is the angle of view of the capture screen and B is the attitude angle of the terminal device.

4. The method according to claim 1, wherein the obtaining the first distance comprises:
    obtaining, by the terminal device, the first distance by using a binocular vision-based ranging method or through measurement by using a time of flight (TOF) camera.

5. The method according to claim 1, wherein the first azimuth is $\theta1=\beta$, and $\beta$ is an attitude angle of the terminal device.

6. The method according to claim 1,
    wherein the first azimuth is $$\theta1 = \beta + \left(\frac{P1}{P} - \frac{1}{2}\right) \times \alpha, \text{ or } \theta1 = \beta + \left(\frac{1}{2} - \frac{P2}{P}\right) \times \alpha,$$

and
    wherein $\theta1$ is the first azimuth, & is an angle of view of the capture screen, $\beta$ is an attitude angle of the terminal device, P1 is a quantity of pixels from a center of the first device in the capture screen to a left edge of the capture screen, P2 is a quantity of pixels from the center of the first device in the capture screen to a right edge of the capture screen, and P is a quantity of pixels corresponding to a width of the capture screen.

7. The method according to claim 1, wherein the method further comprises:
obtaining, by the terminal device, feature information of a first user in the capture screen;
establishing, by the terminal device, a correspondence between the first device and the feature information of the first user; and
storing, by the terminal device, the correspondence.

8. The method according to claim 7, wherein the method further comprises:
establishing, by the terminal device, a second wireless connection to the first device based on the feature information of the first user and the correspondence.

9. A terminal device, comprising:
a processor; and
a memory coupled to the processor,
wherein the memory is configured to store computer program instructions, and
wherein the processor is configured to execute the instructions stored in the memory, so that the terminal device is enabled to perform:
determining a first device in an image displayed on a capture screen;
obtaining a first distance and a first azimuth based on the image, wherein the first distance is between the terminal device and the first device, and the first azimuth is of the first device relative to the terminal device; and
searching a Bluetooth device list for a Bluetooth device matching the first distance and the first azimuth, and establishing a wireless connection to the Bluetooth device,
wherein the searching the Bluetooth device list for the Bluetooth device comprises:
searching the Bluetooth device list for the Bluetooth device whose distance difference is less than or equal to a first preset value and whose azimuth difference is less than or equal to a second preset value,
wherein the distance difference of the Bluetooth device is between the first distance and a second distance, the second distance is between the terminal device and the Bluetooth device and measured by using a Bluetooth positioning function, the azimuth difference is between the first azimuth and a second azimuth, and the second azimuth is of the Bluetooth device relative to the terminal device and measured by using a Bluetooth direction-finding function.

10. The terminal device according to claim 9, wherein the searching the Bluetooth device list for the Bluetooth device comprises:
obtaining an angle of view of the capture screen and an attitude angle of the terminal device;
determining a first device set based on the angle of view and the attitude angle, wherein the first device set is a subset of the Bluetooth device list; and
searching the first device set for the Bluetooth device.

11. The terminal device according to claim 10, wherein the determining the first device set based on the angle of view and the attitude angle comprises:
determining a preset angle range based on the angle of view and the attitude angle; and
determining that the first device set comprises all devices within the preset angle range, wherein, when $\beta+\alpha/2 \leq 360°$, the preset angle range is $[\beta-\alpha/2, \beta+\alpha/2]$, and wherein, when $\beta+\alpha/2>360°$, the preset angle range is a union set of $[0, \beta+\alpha/2-360°]$ and $[\beta-\alpha/2, 360°]$, and wherein " is the angle of view of the capture screen and "is the attitude angle of the terminal device.

12. The terminal device according to claim 9, wherein the obtaining the first distance comprises:
obtaining the first distance by using a binocular vision-based ranging method or through measurement by using a time of flight (TOF) camera.

13. The terminal device according to claim 9, wherein the first azimuth is $\theta1=\beta$ and $\beta$ is an attitude angle of the terminal device.

14. The terminal device according to claim 9, wherein the first azimuth is $$\theta1 = \beta + \left(\frac{P1}{P} - \frac{1}{2}\right) \times \alpha, \text{ or } \theta1 = \beta + \left(\frac{1}{2} - \frac{P2}{P}\right) \times \alpha,$$

and
wherein $\theta1$ is the first azimuth," is an angle of view of the capture screen, $\beta$ is an attitude angle of the terminal device, P1 is a quantity of pixels from a center of the first device in the capture screen to a left edge of the capture screen, P2 is a quantity of pixels from the center of the first device in the capture screen to a right edge of the capture screen, and P is a quantity of pixels corresponding to a width of the capture screen.

15. The terminal device according to claim 9, wherein the terminal device is enabled to further perform:
obtaining feature information of a first user in the capture screen;
establishing a correspondence between the first device and the feature information of the first user; and
storing the correspondence.

16. The terminal device according to claim 15, wherein the terminal device is enabled to further perform:
establishing a second wireless connection to the first device based on the feature information of the first user and the correspondence.

17. A non-transitory computer-readable storage medium having instructions stored thereon that, when executed by a terminal device, cause the terminal device to perform operations, the operations comprising:
determining a first device in an image displayed on a capture screen;
obtaining a first distance and a first azimuth based on the image, wherein the first distance is between the terminal device and the first device, and the first azimuth is of the first device relative to the terminal device; and
searching a Bluetooth device list for a Bluetooth device matching the first distance and the first azimuth, and establishing a wireless connection to the Bluetooth device,
wherein the searching the Bluetooth device list for the Bluetooth device comprises:
searching the Bluetooth device list for the Bluetooth device whose distance difference is less than or equal to a first preset value and whose azimuth difference is less than or equal to a second preset value,
wherein the distance difference of the Bluetooth device is between the first distance and a second distance, the second distance is between the terminal device and the Bluetooth device and measured by using a Bluetooth positioning function, the azimuth difference is between the first azimuth and a second azimuth, and the second azimuth is of the Bluetooth device relative to the terminal device and measured by using a Bluetooth direction-finding function.

18. The non-transitory computer-readable storage medium according to claim 17, wherein the searching the Bluetooth device list for the Bluetooth device comprises:
obtaining an angle of view of the capture screen and an attitude angle of the terminal device;
determining a first device set based on the angle of view and the attitude angle, wherein the first device set is a subset of the Bluetooth device list; and
searching the first device set for the Bluetooth device.

19. The non-transitory computer-readable storage medium according to claim 18, wherein the determining the first device set based on the angle of view and the attitude angle comprises:
determining a preset angle range based on the angle of view and the attitude angle; and
determining that the first device set comprises all devices within the preset angle range,
wherein, when $\beta+\alpha/2 \leq 360°$, the preset angle range is $[\beta-\alpha/2, \beta+\alpha/2]$
wherein, when $\beta+\alpha/2 > 360°$, the preset angle range is a union set of $[0, \beta+\alpha/2-360°]$ and $[\beta-\alpha/2, 360°]$, and wherein "is the angle of view of the capture screen and P is the attitude angle of the terminal device.

20. The non-transitory computer-readable storage medium according to claim 17, wherein the obtaining the first distance comprises:
obtaining the first distance by using a binocular vision-based ranging method or through measurement by using a time of flight (TOF) camera.

* * * * *